United States Patent [19]

Smith

[11] Patent Number: 4,793,449
[45] Date of Patent: Dec. 27, 1988

[54] RAILRAOD TRUCK BRAKING SYSTEM
[75] Inventor: Sam D. Smith, Richton Park, Ill.
[73] Assignee: Thrall Car Manufacturing Company, Chicago Heights, Ill.
[21] Appl. No.: 114,637
[22] Filed: Oct. 28, 1987
[51] Int. Cl.$^4$ ............................................. B60T 13/38
[52] U.S. Cl. ........................................ 188/107; 92/29; 188/170; 303/2
[58] Field of Search ................. 92/29, 63, 130 A, 137; 188/107, 170, 216; 303/2, 6 M, 13, 68

[56] References Cited

U.S. PATENT DOCUMENTS

| | | | |
|---|---|---|---|
| 2,531,055 | 11/1950 | Kirk | 188/107 |
| 3,020,094 | 2/1962 | Murty et al. | 188/170 X |
| 3,729,070 | 4/1973 | Le Marchand | 188/216 X |
| 4,033,629 | 7/1977 | Spalding | 188/107 X |
| 4,049,088 | 9/1977 | St Jarne et al. | 188/107 |
| 4,080,875 | 3/1978 | Repolovsky et al. | 92/130 A X |
| 4,552,056 | 11/1985 | McKay | 188/170 X |
| 4,649,804 | 3/1987 | Oberlander | 92/130 A X |

Primary Examiner—Duane A. Reger
Attorney, Agent, or Firm—Marshall, O'Toole, Gerstein, Murray & Bicknell

[57] ABSTRACT

A railroad truck having at least four wheels comprising brakes for braking the wheels; a single enclosed air cylinder mounted on the truck; the air cylinder having first and second chambers; a conduit to supply service air pressure to the first chamber; the first chamber containing a piston pneumatically operated by service air pressure to apply controlled service braking pressure, emergency braking pressure and, when the truck is stopped, parking braking pressure, to the brakes; the second chamber containing a spring which applies automatic parking pressure to the brakes when the truck is stopped, and applies emergency fail-safe pressure to the brakes when there is a pneumatic system failure to supply air to the first chamber; apparatus to supply pressurized air to the second chamber to keep the spring from applying pressure to the brakes so long as adequate air pressure is maintained in the second chamber; a handbrake assembly mounted on the truck in a position readily accessible for manual operation when the railroad truck is joined to a vehicle or separated therefrom; and the handbrake assembly including a longitudinally reciprocal rod operative to compress the spring so that the brakes can be fully released and maintained released for an indefinite time so long as pneumatic braking pressure is not applied to the first chamber and upon reverse movement of the said longitudinally reciprocal rod compression of the spring is released so that the spring can apply pressure to the brakes unless pneumatic pressure supplied to the first and second chambers prevents application of braking pressure by the spring.

10 Claims, 7 Drawing Sheets

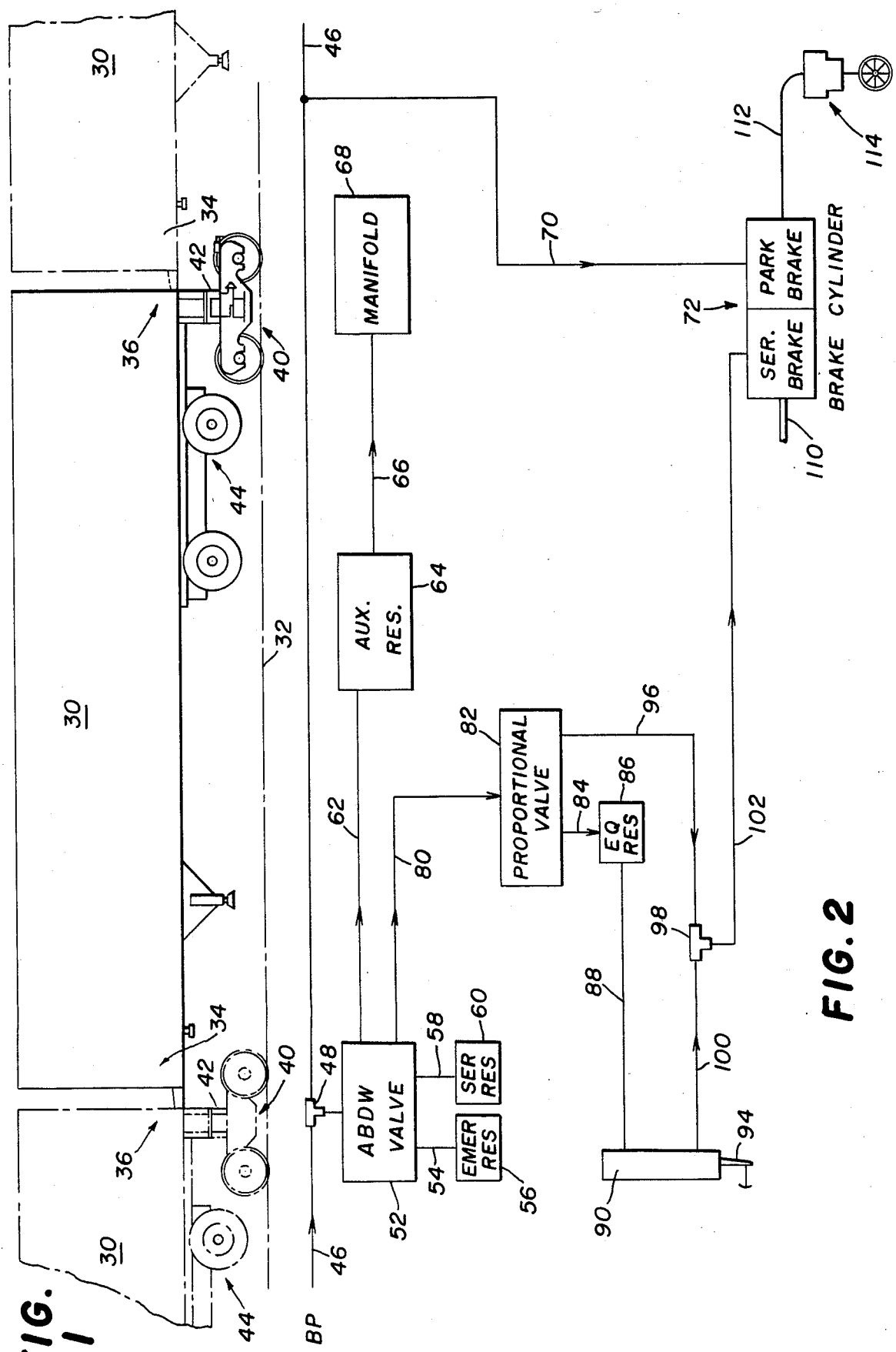

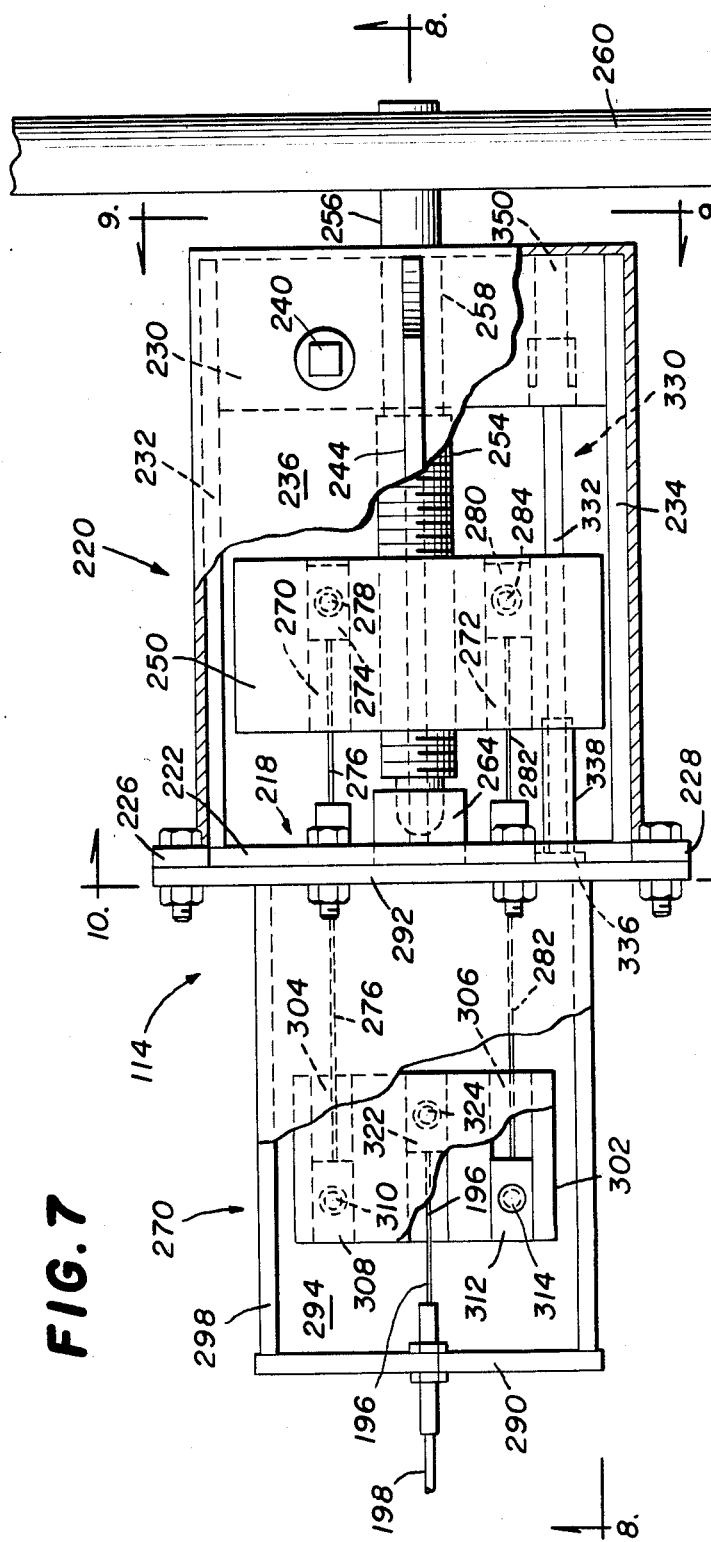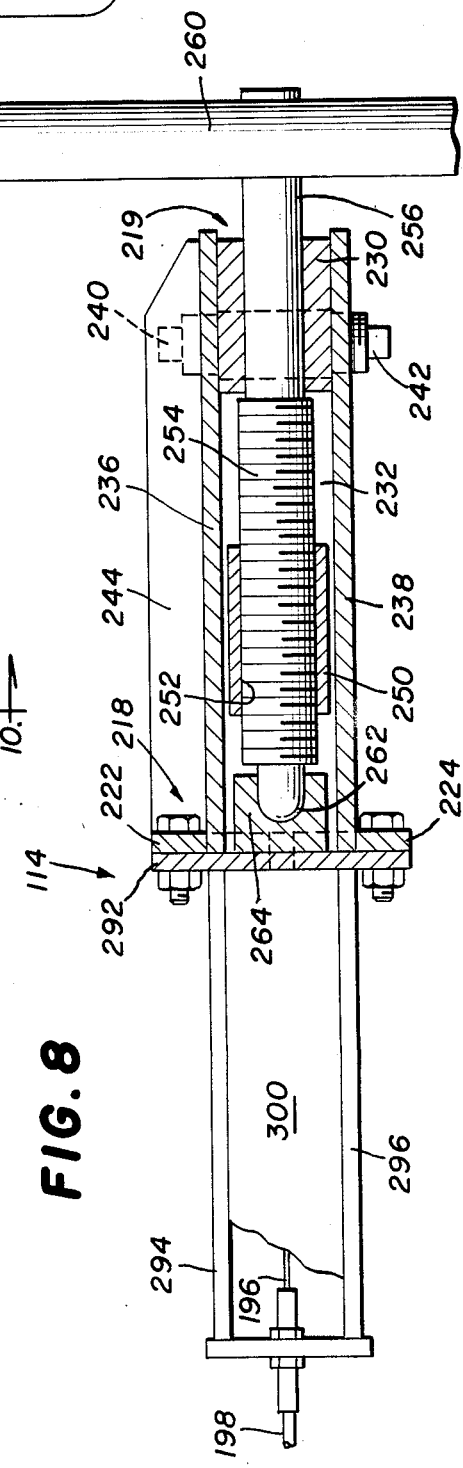

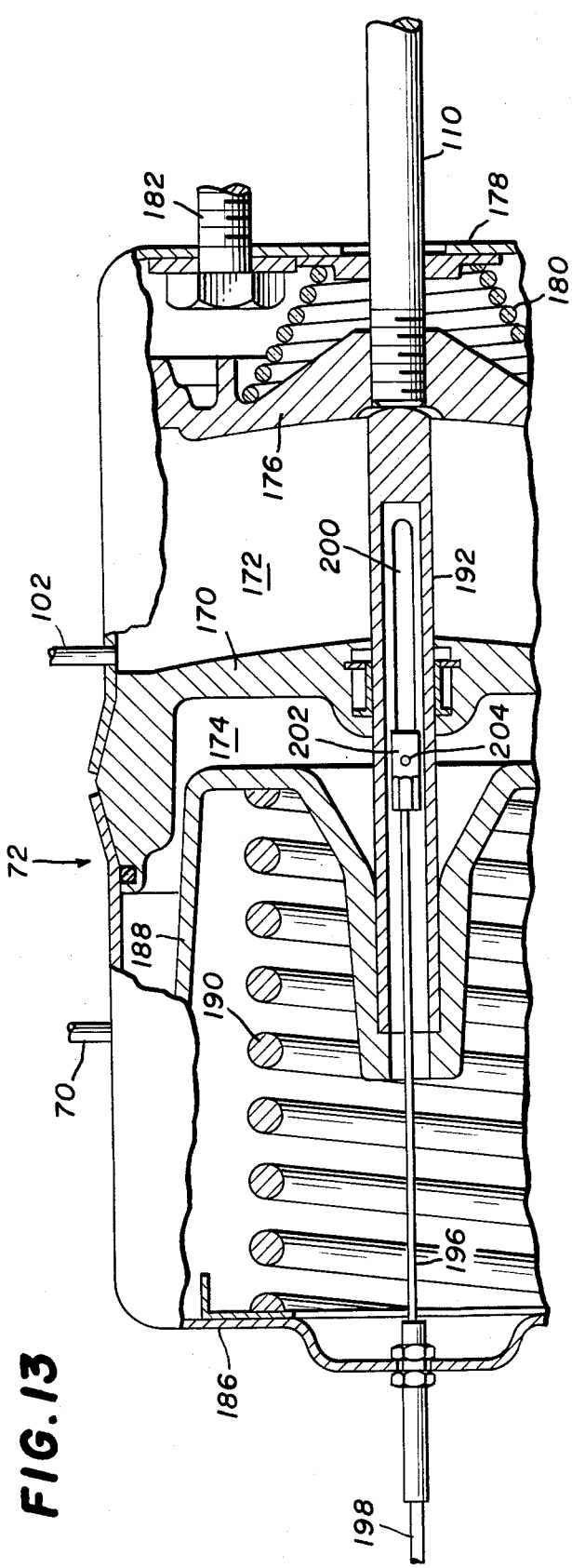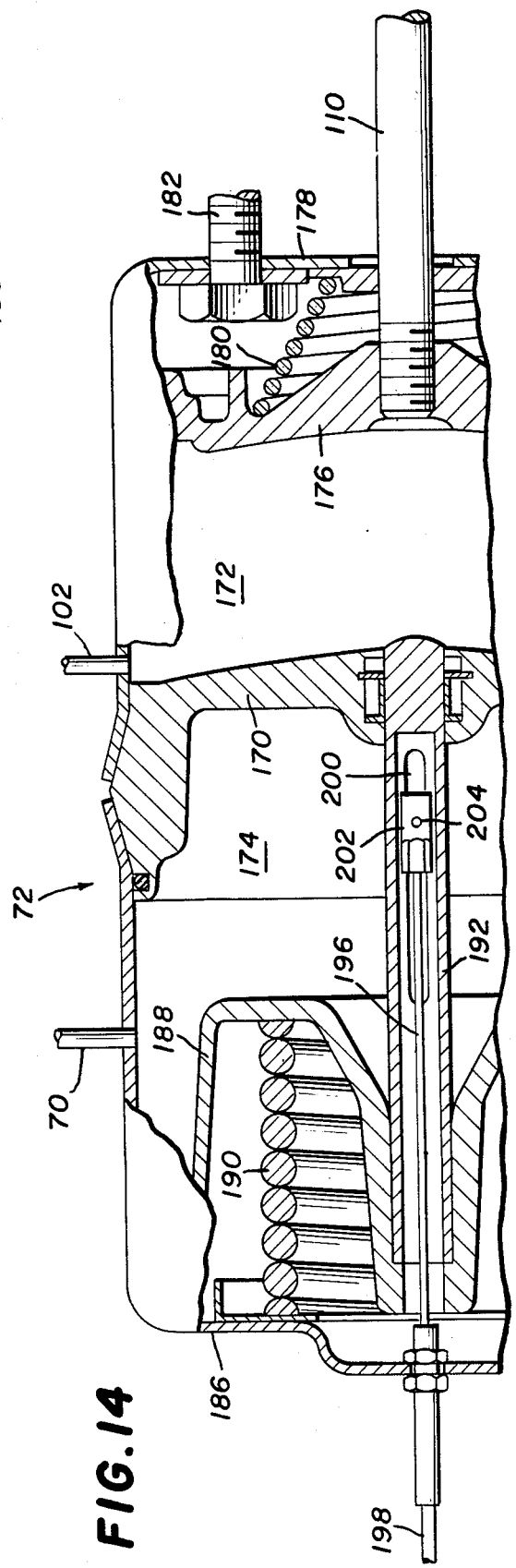

RAILRAOD TRUCK BRAKING SYSTEM

This invention relates to railroad trucks. More particularly, this invention is concerned with a railroad truck having a single dual acting cylinder mounted thereon which pneumatically controls all truck braking applications, and a handbrake assembly also mounted on the truck for manual parking brake release and parking brake application but which is automatically pneumatically overridden by a train engineer.

BACKGROUND OF THE INVENTION

During the last century practically all freight trains have used a standard handbrake operation to keep unattended vehicles or freight cars from rolling away. By means of a wheel or handle mechanical force has been applied against the brake shoes to develop enough friction to prevent the wheels from rotating. This practice applies to individual and groups of coupled vehicles and vehicles forming part of a train consist.

When a train consist stops, the pneumatic brake will produce braking force which holds the vehicles stationary only so long as compressed air is available. During long periods the air will leak out and the braking pressure will drop so low as to be inadequate to brake the vehicles. When that happens, or may likely occur, a trainman must walk the length of a train, many of which are a mile long, and set hand brakes to park the vehicles indefinitely. He must then walk the train again to release the handbrakes before the train can be moved. Because of train lengths this takes considerable time. As a result, it has become common practice to set only one handbrake out of several to reduce the tiresome labor and time involved in this task. What happens though is that the same or a different trainman later cannot readily tell which brakes are set and must be released so that much too often brakes are not released when vehicles and trains are moved again. The brake resistance can cause wheels to overheat and cause wrecks. Also, because the handbrakes are in accessible to the crew while a freight train is moving, they are useless as a fail safe device in the event all air pressure is lost so the handbrakes add nothing to safety during vehicle movement but can only lower safety.

An economic evaluation by the Association of American Railroads has determined that a significant portion of the yearly wheel replacement cost of $40,000,000 is attributable to handbrake problems and this apparently does not include accident related cost or take into consideration the personal hazard involved. Also, the expense of manually operating the handbrakes independently is very high.

The described braking problem is not limited to conventional freight trains. In recent years there has been considerable interest in the United States in transportation equipment which is suitable for both railroad and highway use. There is particular concern with developing equipment which will permit over the highway trailers to be coupled together to form railroad trains of such trailers. In one system, a railroad truck is releasably coupled through an adapter to the rear bottom of each trailer. The front end of a following trailer is also coupled to the rear end of a leading trailer by a male-female coupling system. One system of this type is disclosed in Wicks et al U.S. Pat. No. 4,669,391. After a train of trailers coupled together in this manner reaches its destination the trailers are uncoupled from each other and from the railroad trucks, which remain on the tracks. The trailer wheels are lowered and then the trailer is towed away by a tractor. The railroad trucks must then be stored until needed to form another train of over the highway trailers. For safety, each truck should have its own handbrake so that it can be prevented from rolling away.

Each railroad truck used in trains of the described type are desirably provided with all or nearly all the braking apparatus necessary for required braking, other than the service braking air pressure provided by the train through an air line carried by each trailer for the train length. The brakes may be of the type shown in Mersereau U.S. Pat. No. 3,442,358. While the braking system disclosed in this patent utilizes a truck mounted cylinder for braking operation, it appears that it must use only conventional service braking air pressure and conventional emergency braking air pressure supplied from a reservoir mounted on a car body. A need exists, accordingly, for a largely truck mounted braking system which incorporates a single dual acting cylinder which controls a plurality of desirable braking functions including service braking, fail safe emergency braking, automatic parking braking, automatic air release of parking braking, parking brake manual release and variable load or empty load braking.

From the above discussion it is clear that a need exists for improved parking brakes on conventional freight cars, trains of trailers and railroad trucks which improve safety, reduce labor and improve overall reliability of the braking system.

SUMMARY OF THE INVENTION

According to the invention there is provided a railroad truck having at least four wheels comprising brake means for braking each wheel; a single enclosed air cylinder mounted on the truck; the air cylinder having first and second chambers; the first chamber having pneumatically operated means which applies controlled service braking pressure, emergency braking pressure and parking braking pressure to the brake means when the truck is stopped; the second chamber containing spring means which applies automatic parking pressure to the brake means when the truck is stopped, and applies emergency fail-safe pressure to the brake means, when there is a pneumatic system failure to supply air to the first chamber; a pneumatic conduit to the second chamber to supply pressurized air to the second chamber to keep the spring means from applying pressure to the brake means so long as adequate air pressure is maintained in the second chamber; a handbrake assembly mounted on the truck in a position readily accessible for manual operation when the truck is joined to a train vehicle or separated therefrom; and with the handbrake assembly including reversible means operatively connected to the spring means to compress the spring means until the brake means is fully released and maintained released for an indefinite time and upon reverse operation of the said reversible means compression of the spring means applies pressure to the brake means.

The truck brake apparatus can also include a pneumatic conduit from the brake pipe to the second chamber to keep the spring means from applying pressure to the brake means during train operation.

The handbrake assembly can include longitudinally reciprocal means operative to compress the spring means so that the brake means can be fully released and maintained released for an indefinite time so long as pneumatic braking pressure is not applied to the first chamber and so that upon reverse movement of the said longitudinally reciprocal means compression of the spring means is released and the spring means can apply pressure to the brake means unless pneumatic pressure supplied to the first and second chambers prevents application of braking pressure by the spring means.

In a more specific embodiment of the invention there is provided a railroad truck having at least four wheels comprising brake means for braking each wheel; a single enclosed air cylinder having opposing first and second ends mounted on the truck; the cylinder having a diametrically positioned stationary bulkhead; the cylinder having a first chamber having a first piston on a first side of the bulkhead; means to apply service braking, emergency braking and parking braking pneumatic pressure in the first chamber between the bulkhead and first piston to outwardly displace the first piston; a first piston rod joined to the first piston and extending outwardly from the cylinder into engagement with means operably joined to brake shoes to apply braking pressure to the brake means with outward movement of the first piston; the cylinder having a second chamber having a second piston on a second side of the bulkhead; means to apply pneumatic parking braking release pressure in the second chamber between the bulkhead and second piston to displace the second piston away from the bulkhead; spring means, between the second piston and the second cylinder end, forcing the second piston towards the bulkhead; a second piston rod joined to the second piston and in independently operable communication with the first piston rod so that the spring means can apply a compressive force to the first piston rod for parking braking and also emergency fail-safe braking upon loss of all pneumatic pressure; a handbrake assembly mounted on the truck in a position readily accessible for manual operation when the truck is joined to a train vehicle or separated therefrom; and the handbrake assembly including means operatively connected to the second piston to displace it and compress the spring means until the brake means is fully released and maintain the brake means released for an indefinite time.

The handbrake assembly can include a body spaced from the cylinder and a flexible tubular member extending from the body to the cylinder; the longitudinally reciprocal means can include a flexible cable slidably positioned in the tubular member; the body can have an axially stationary rotatable screw having means to rotate the screw in both directions; a movable block can be drivably engaged by the screw for longitudinal displacement in both directions upon rotation of the screw; the flexible cable can have a first end portion fixedly connected to the block; and the flexible cable can have a second end portion extending into the cylinder and operatively connected to the spring means to compress the spring means from the extended state it assumes when train service air pressure to the cylinder is released, to the substantially fully compressed state it assumes when train air service pressure is applied to the cylinder.

The combination of flexible cable inside the tubular member is known to those skilled in the art as a Bowden cable, as see U.S. Pat. No. 4,392,538.

The cable second end portion may be operatively connected to the spring means by means which permits full independent compression of the spring means by train service air pressure while the cable is longitudinally stationary.

The truck can have a truck bolster mounted in opposing side frames which are supported by a pair of axles, each having two wheels; and the handbrake assembly body can be mounted on one of the side frames and, more specifically, o the top end of one of the side frames. A handwheel can be mounted on the screw for manual rotation of the screw.

The handbrake assembly body can include an indicator which signifies whether the truck brakes are released or applied. The indicator is desirably operable by movement of the block. The indicator can include a pin which projects out of the body when the parking brakes are released and remains in the body when the parking brakes are on.

The parking brake system of the invention improves safety, reduces labor and improves overall reliability of the brake system. The parking means complements the pneumatic means in that one will occur only when the other does not, thus, neither can reduce the reliability of the other.

The parking means is automatically available anytime pneumatic pressure is not adequate and the presence of pneumatic capability automatically cancels the parking means. The parking brake will automatically take over when air pressure decreases because of air leaks on a standing train. This eliminates the need to walk a train and set brakes. The parking brake will automatically cancel out when the pneumatic system is recharged for moving the train and this will again eliminate the need to walk a train. The spring means remains available 100% of the time and thus the worst consequence of losing all pneumatic control is for the spring brakes to bring the train to a safe but positive halt, thus providing an improvement in reliability.

The improved brake system reduces or eliminates the previously inherent adverse consequences of failing to operate handbrake controls properly. In a conventional system where the parking brake is manually applied, the worst consequence of forgetting to release even a single brake in a train can be to cause a wreck. In accordance with this invention, the parking brake manual control is used to cancel the spring means, and which also occurs automatically as the brake system is pressurized, so that the position of the manual control has no effect upon the safety of a moving train. The only consequence of improperly operating a single handbrake control on a truck in a train is to eliminate the spring means as a back-up for the pneumatic means on one truck only, leaving all other trucks fully fail-safe so that should all pneumatic means fail the train would come to a positive halt automatically.

In a conventional braking system a pneumatic cylinder having one chamber is used. In this invention a single cylinder having two chambers is used for providing both spring and pneumatic braking pressure. Even so, the handbrake permits application of parking braking according to the invention and also release of the parking brake.

BRIEF DESCRIPTION OF THE DRAWINGS

FIG. 1 is a side elevational view of a train made up of over-the-highway trailers coupled together end to end with the end of each trailer supported by a four-wheel two axle truck releasably coupled to the trailer by means of an adapter;

FIG. 2 is a schematic drawing of the braking system according to the invention in use on the trucks illustrated in the train of FIG. 1;

FIG. 7 is a plan view, partially broken away, of the handbrake assembly shown in FIG. 6;

FIG. 8 is a partial sectional view of the handbrake assembly taken along the line 8—8 of FIG. 7;

FIG. 13 is a partially broken away sectional view of the air cylinder shown in FIG. 6 but with the spring brake applying braking pressure to the truck brakes;

FIG. 14 is a partially broken away sectional view of the air brake cylinder shown in FIGS. 6 and 13 but with the spring brake shown in brake release position with pressurized air in the emergency or auxiliary brake release chamber and in the service chamber.

DETAILED DESCRIPTION OF THE DRAWINGS

Figure 3:
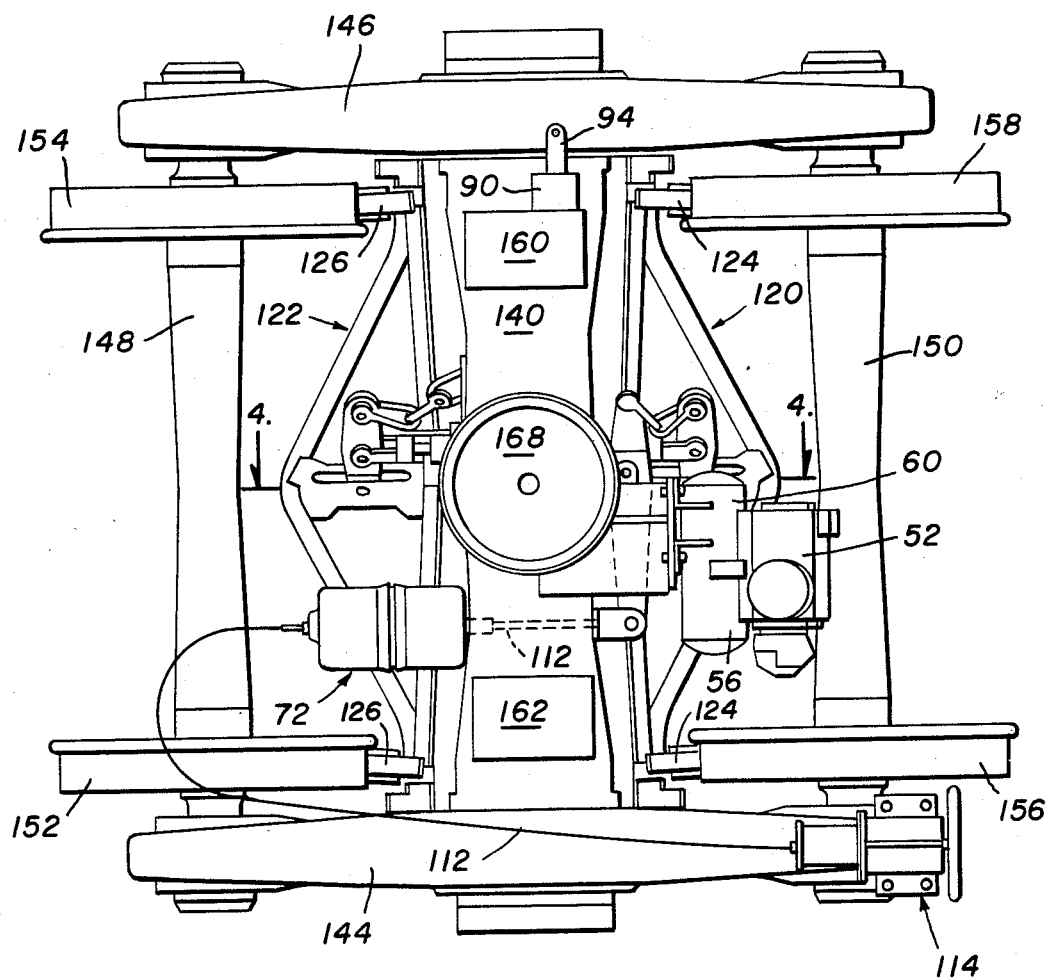
FIG. 3 is a plan view of the truck shown in FIG. 1 with the adapter removed.
Figure 4:
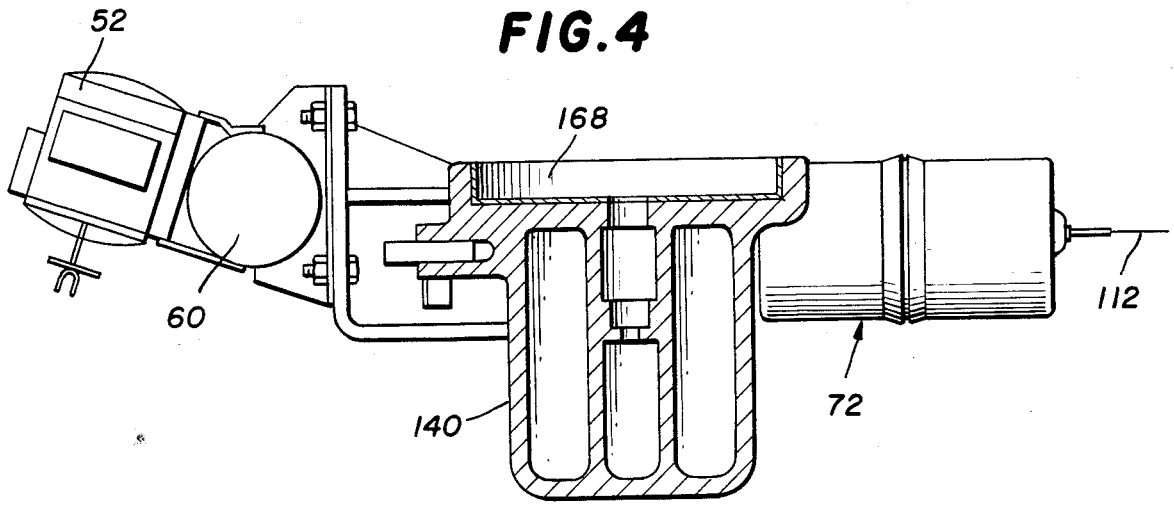
FIG. 4 is a sectional view taken along the line 4—4 of FIG. 3 and shows the air cylinder, brake control valve and air reservoir.
Figure 9:
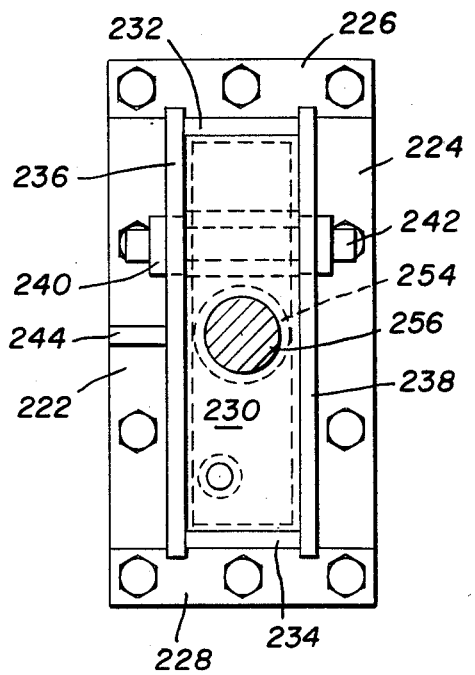
FIG. 9 is an end view of the handbrake assembly taken along the line 9—9 of FIG. 7.
Figure 10:
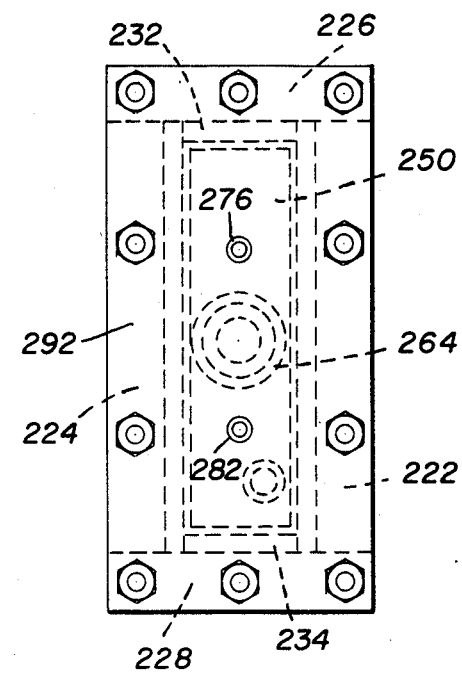
FIG. 10 is a view of the handbrake assembly taken along the line 10—10 of FIG. 7.

To the extent it is reasonable and practical the same or similar elements which appear in the various views of the drawings will be identified by tee same numbers.

With reference to FIG. 1, the over-the-highway trailers 30 form a train which runs on track 32. The leading end 34 of each following trailer is directly coupled to the rear or back end 36 of each leading trailer by a male-female coupling such as shown in Browne et al U.S. Pat. No. 4,202,454. The back end of each trailer 30 is supported by a four wheel two axle truck 40 having a truck bolster on which an adapter 42 of suitable design is supported. The adapter 42 releasably couples the trailer 30 to the truck 40 for railroad travel. Each trailer has conventional over-the-highway wheel assemblies 44 which are mounted on air springs so that the wheel assemblies can be raised for railroad travel and lowered for highway travel when the train consist is broken up and the separate trailers are joined to a highway tractor fifth wheel.

Each trailer 30 has an air brake pipe 46 extending the length of the trailer which can be coupled to the next trailer and to the truck brake system by means of a Tee 48 as shown in FIG. 1. Air line 50 supplies brake line pressurized air to a conventional control valve 52 which preferably is a model ABDW valve. Emergency air reservoir 56 communicates with control valve 52 by air pipe 54 and service air reservoir 60 communicates with control valve 52 by pipe 58. Pipe 62 communicates with control valve 52 and auxiliary reservoir 64. Pipe 66 communicates with auxiliary reservoir 64 and optional manifold 68. Pipe 70 from brake pipe 46 communicates with the spring parking brake chamber 174 of brake cylinder 72.

Also as shown in FIG. 2, air pipe 80 communicates with control valve 52 and proportional valve 82. Pipe 84 communicates with proportional valve 82 and air equalizing reservoir 86. Pipe 88 extends from equalizing reservoir 86 to an S-1 sensor valve 90 having an operating arm 92 which is operated by lever 94. Also extending from proportional valve 82 is pipe 96 which communicates with Tee 98 as does pipe 100 which communicates with S-1 sensor valve 90. Pipe 102 extends from Tee 98 to the service brake chamber of brake cylinder 72. Extending outwardly from one end of brake cylinder 72 is cylinder rod 110 which is operatively connected to the braking mechanism on truck 40. A handbrake control cable 112 extends out of the other end of brake cylinder 72 and is operatively connected to handbrake assembly 114 mounted on a side frame of truck 40 (FIG. 3). The described braking system is substantially conventional except for the type of brake cylinder used and the handbrake assembly which will be described in detail hereinafter.

Figure 5:
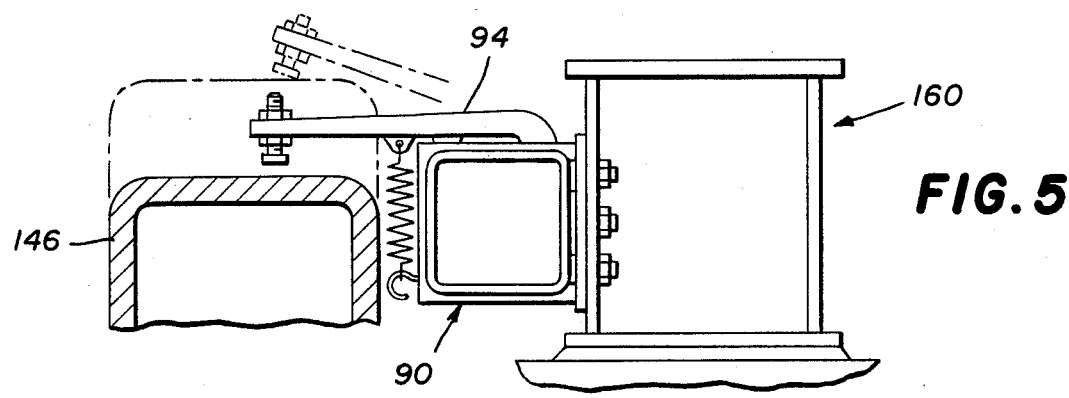
FIG. 5 is a side view of the brake load sensor valve mounted on the truck bolster as shown in FIG. 3.

The plan view of truck 40 comprising FIG. 3 illustrates the major components of the truck and the braking equipment plus the location of the brake cylinder 72 and the handbrake assembly 114. The truck 40 has a bolster 140 the ends of which ride on springs in side frames 144 and 146 in the usual manner. Bolster 140 is provided with side bearing supports 160,162 to stabilize the trailer body against roll. The truck braking mechanism includes brake beams 120,122 which have brake shoes 124,126 which bear against the wheels. Further details of the truck are disclosed in Mersereau et al U.S. Pat. No. 3,298,475. The S-1 sensor valve 90 can be mounted on the side wall of side bearing support 160 (FIG. 5). The adapter 42 is supported by bearing pocket 168 in the center of bolster 140. The axles 148,150 containing the wheels 152,154,156,158 are mounted in the frames.

The brake cylinder 72 is mounted on one side of bolster 140 and the brake control valve 52, emergency reservoir 56 and service reservoir 60 can be mounted on the other side. The auxiliary reservoir and manifold can also be mounted on the truck bolster in a suitable location. Since the truck is to be detached from the trailer and kept on the railroad tracks it is desirable to have all, or nearly all, of the braking equipment mounted on the truck to keep the trailer weight low.

Figure 6:
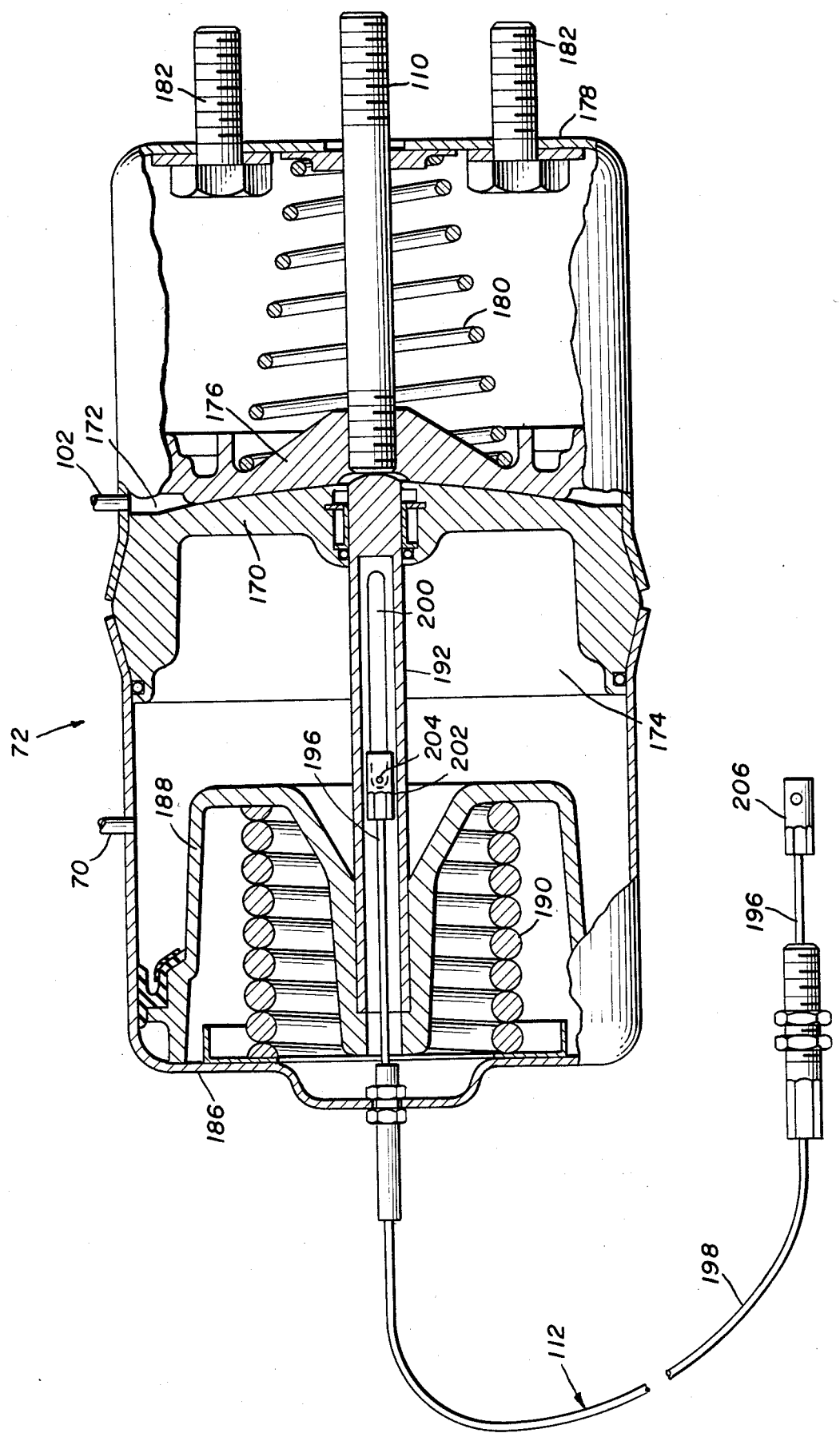
FIG. 6 is a sectional view of an air brake cylinder which has been modified so as to be useful in the handbrake assembly of the invention.

The brake cylinder 72 is shown in more detail in FIG. 6. Brake cylinders of this type, except as modified for the subject invention, have been previously used on trailer air brakes and is marketed by Aeroquip Corporation, Lawrence, Kans. under the name Maxibrake Type 50.

Brake cylinder 72 has a centrally located bulkhead 170 which defines a service air chamber 172 and a parking brake/emergency brake air chamber 174 which are supplied with air by pipes 102 and 70 respectively. Service piston 176 is located between bulkhead 170 and the end 178 of the brake cylinder. The service air chamber 172 specifically is the variable air volume between bulkhead 170 and service piston 176. Pressurized air supplied to chamber 172 provides train service braking, emergency braking and train parking braking. Conical coil spring 180 is axially located within the brake cylinder and extends from cylinder end 178 to the service piston 176 to keep the service piston against the bulkhead and the truck brakes released except when pressurized air is supplied to service chamber 172 to apply the brakes. Cylinder rod 110 has its internal end fixedly joined to service piston 176 so that they move simultaneously. Three bolts 182 are provided to secure the brake cylinder on the truck 40.

Between bulkhead 170 and the other end 186 of the brake cylinder 72 there is positioned a parking/emergency brake piston 188. A coil booster spring 190 is located between cylinder end 186 and piston 188 so that the piston always has a force applied against it to move it towards the bulkhead 170 unless restrained by air fed to chamber 174. A hollow rod 192 is axially positioned in the brake cylinder 72 and one end is fixedly joined to piston 188 while the other end is slidably located in an axial hole in bulkhead 170 to contact the adjacent end of cylinder rod 110. Since spring 190 is stronger than spring 180 the piston 188 is forced towards the bulkhead by spring 180 when no pressurized air is in chamber 174. That causes rod 192 to push rod 110 outwardly to thereby apply parking brake/emergency braking to the truck as shown in FIG. 13, provided that the handbrake is not in brake release position.

The handbrake control cable 112 has an internal flexible cable or wire rope 196 which slides inside of a sheath 198 in a well known manner. One end of sheath 198 is fixably connected to the end 186 of the brake cylinder 72 and the other end of the sheath is fixedly joined to the handbrake assembly 114.

The hollow rod 192 has a pair of elongated opposing axial slots 200 which extend for a portion of the rod length. A substantially cylindrical fitting 202, swaged onto the end of the cable or wire rope 196, is located in hollow rod 192 and is provided with a lateral pin 204, the ends of which fit in slots 200 thereby providing a type of lost motion connection. The other end of wire rope 196 is also provided with a cylindrical swaged fitting 206 which is connected to the handbrake assembly 114. When the fitting 202 is at the left end of slots 200, as a result of the handbrake compressing spring 190 by pulling rod 192 to the left, the spring 180 forces cylinder rod 110 to the left and the brakes on the truck are held released. This, however, does not prevent service brake air pressure supplied to chamber 172 from braking the truck. Only the parking brake/emergency brake are rendered inactive on a single truck if this occurs by means of the handbrake being left in released position when in a train consist.

FIGS. 7 to 12 further illustrate the handbrake assembly 114 which is mounted on the top end of truck side frame 144 so as to be readily accessible and not beneath the back end of trailer 30 which has the adapter structure and side bearings beneath it.

The handbrake assembly 114 has a first box 220 and a second box 270 connected to the end of the first box 220. Box 220 has a first end 218 in the form of a frame made up of top and bottom horizontal strips 222 and 224, and spaced apart vertical strips 226 and 228 joined to strips 222 and 224. The second end 219 constitutes a front bearing block 230. Box 220 also includes first side wall 232, second side wall 234, top plate 236 and bottom plate 238 which are joined to the first and second ends 218 and 219. Pipe plug 240 in top plate 236, and pipe plug 242 in bottom plate 238, provide access for adding and withdrawing oil to the box. A vertical rib 244 is joined to the top of top plate 236 to reinforce it.

Traveling block 250 is located in box 220. Block 250 has a centrally located internally threaded hole 252 with which the lefthanded threaded portion 254 of handwheel screw shaft 256 is engaged. The shaft 256 extends through hole 258 in block 230. Handwheel 260 is fastened to the outer end of shaft 256. The inner end 262 of shaft 256 is rounded and fits into a mating recess in bearing 264 mounted on the outside of plate 292.

Two spaced apart parallel identical holes 270 and 272 are located in traveling block 250. Hole 270 receives a fitting 274 on the en of cable or wire rope 276 and pin 278 secures it to block 250. Similarly, hole 272 receives a fitting 280 on the end of cable or wire rope 282 and pin 284 secures it to block 250 (FIG. 7).

The second box 270 (FIG. 7) has a first end plate 290, a second end plate 292, top plate 294, bottom plate 296 and side plates 298 and 300. The second end plate 292 is bolted to the frame made up of strips 222,224,226 and 228. The bearing block 264 is mounted on the outer surface of plate 292. A traveling block 302 is located in second box 270. Block 302 has two spaced apart identical holes 304,306. Fitting 308 on the end of wire rope 276 is held in hole 304 by pin 310 which engages block 302. Similarly, fitting 312 on the end of wire rope 282 is held in hole 306 by pin 314.

Traveling block 302 also has a centrally located hole 320 in which fits a fitting 322 on the end of wire rope 196. The fitting 322 is secured in place by pin 324 which engages block 302.

When the handwheel 260 is rotated counterclockwise it moves tee traveling block 250 towards the handwheel and thereby applies tension to the pair of cable or wire ropes 276,282 which pull on traveling block 302 which then applies tension on wire rope 196 in the control cable 112. The tensile force applied to cable or wire rope 196 pulls on rod 192 which causes spring 190 to be compressed thereby releasing the truck brakes. The truck is then free to be rolled when detached from a trailer and when in a train consist. When handwheel 260 is rotated clockwise, tension on wire rope 196 is released and this permits spring 190 to expand with application of the truck brakes. The described operation is, in one sense, just the opposite of conventional handbrakes in use on railroad cars since they require the application of force by the handbrake wheel to apply the brakes, not release them.

Figure 11:
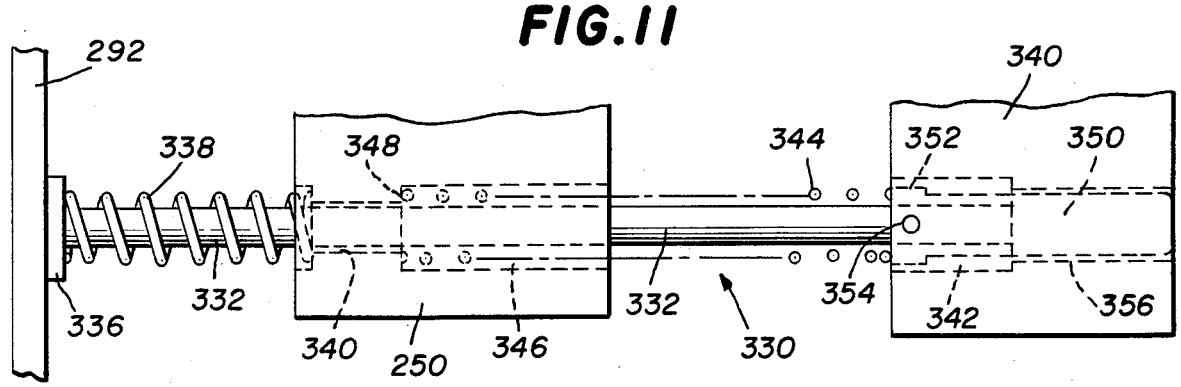
FIG. 11 is a plan view of the handbrake assembly indicator mechanism which indicates whether the handbrake is released or is applying braking pressure.
Figure 12:
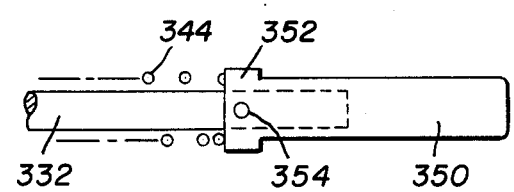
FIG. 12 is an enlarged view of the indicator finger illustrated by FIG. 11.

The handbrake assembly 114 is provided with a brake indicator mechanism 330 so that the brakeman can quickly determine whether the truck brakes are applied or not (FIGS. 7, 11 and 12). The brake indicator mechanism 330 includes a rod 332 having a head 336 on the end. Head 336 contacts plate 292. A coil spring 338 surrounds rod 332 and extends from head 336 to traveling block 250. The spring 338 has a predetermined length. When compressed by movement of traveling block 250 towards plate 292 the rod 332 is forced toward plate 292. The rod 332 extends through an oversized hole 340 in block 250 and into a hole 342 in block 340. A second coil spring 344 surrounds rod 332. One end of spring 344 fits into a larger hole, 346 having a bottom 348 against which the spring abuts. The outer end of rod 332 is fitted with an indicator finger 350 having an enlarged shoulder 352 against which the spring 344 adjacent end can press. Finger 350 has an axial hole into which the end of rod 332 fits and is secured to the finger by a pin 354 which extends laterally through them both. The finger 350 fit loosely into oversized hole 356 in block 340. The finger shoulder 352 can slide in hole 342 until the shoulder 352 hits the bottom of this hole. In that way, the distance of which the finger 350 can extend out of, or protrude from, block 340 is limited.

When the handwheel 260 is turned counterclockwise the traveling block 250 moves to the right towards the handwheel. This increases the distance between rod head 336 and block 250 to a distance greater than the length of spring 338 when at rest. As the block 250 continues to move to the right the spring 344 is compressed and this causes the rod 332 to move to the right since the spring applies force onto shoulder 352. The finger is thereby moved to the right until a brake release indicating portion protrudes from block 340. Once the shoulder 352 contacts the bottom of hole 342 the outward displacement of finger 350 ceases even though further counterclockwise rotation of the handwheel 260 causes block 250 to more further to the right and further decrease handbrake pressure but increase pressure on spring 190 With the finger 350 extending even a small distance out of block 340 the brakeman knows the brake is released and that to apply the brake he must rotate the handwheel clockwise until the finger retreats fully into block 340. The finger will stay out and exposed until spring 344 is no longer compressed and is at rest. This can occur shortly before block 250 contacts spring 338. Once block 250 contacts spring 338 and the block is moved to the left, spring 338 is compressed and rod 332 is forced to the left so that finger 350 is positively forced into block 340 thereby indicating that the handbrake is applied.

Turning now to FIG. 13, this figure shows the position of spring 190 with the truck braked by the spring emergency/parking brake. The cable or wire rope 196 has been released by turning the handwheel clockwise permitting spring 190 to apply braking pressure. No service braking air is applied in chamber 172 and no air is applied to chamber 174. The cylinder as shown in FIG. 13 represents conditions which exist when a train consist is parked or when a truck is separated from a trailer and sits at rest braked.

The brake cylinder 72 as shown in FIG. 14 represents its state when service air occupies chamber 172 and a train consist is being braked. At that time parking brake air in chamber 174 maintains spring 190 compressed so that no parking brake pressure is applied to the truck brakes. When FIGS. 13 and 14 are compared it will be readily seen that rod 192 can move axially unrestrained by cable or wire rope 196 and fitting 202 as spring 190 is expanded and compressed. Only when the parking brake is to be released by the handbrake compressing spring 190 which causes fitting 202 to move to the left a maximum distance to pull rod 192 to the left as far as it will move is the spring brake prevented from operating.

Figure 15:
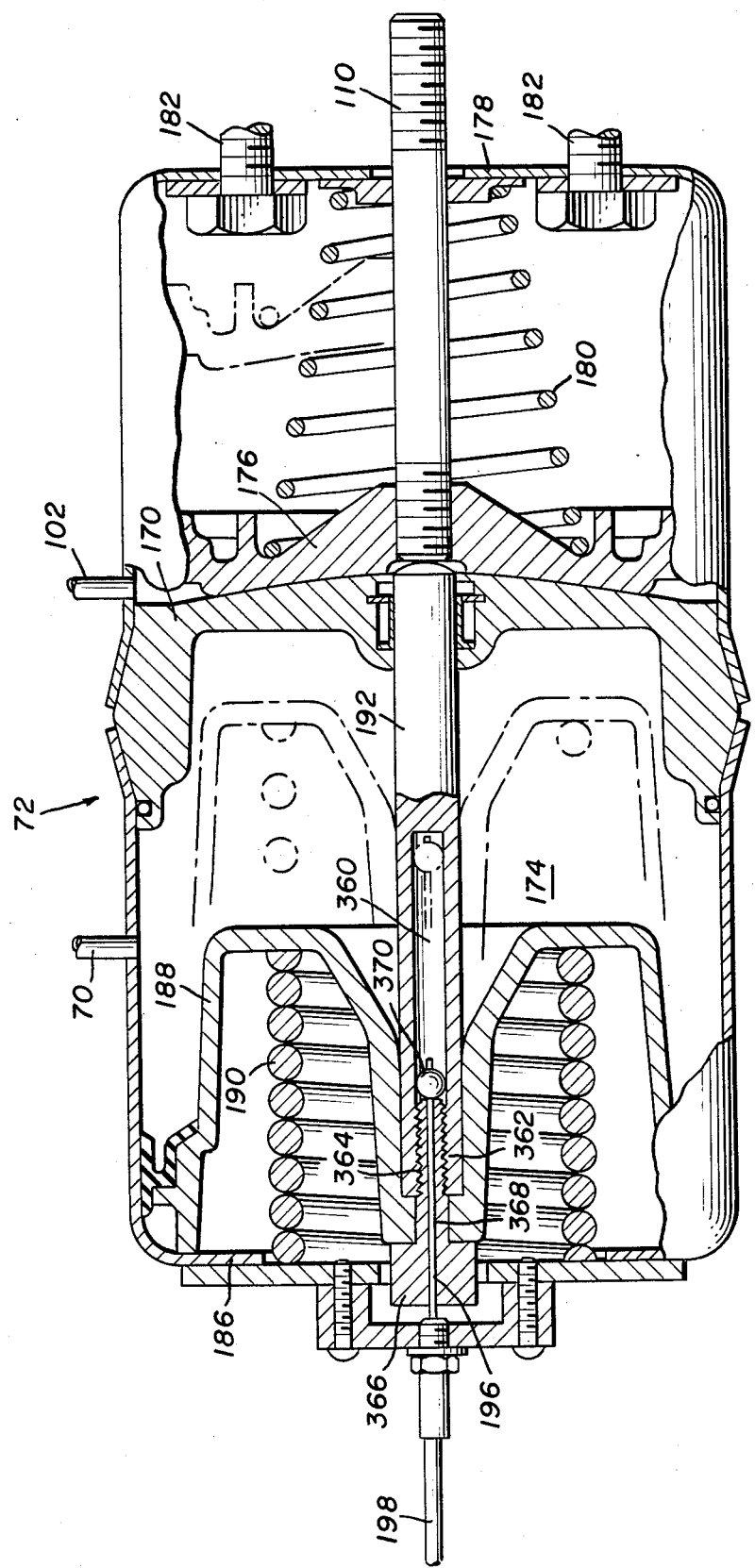
FIG. 15 is a sectional view of the air brake cylinder shown in FIGS. 6, 13 and 14 with an alternative means to connect the handbrake control cable or wire rope to the spring brake operating rod.

FIG. 15 illustrates the same brake cylinder shown in FIGS. 6, 13 and 14 with, however, an alternative means of connecting cable or wire rope 196 to rod 192 by a lost motion connection. In this embodiment, rod 192 is provided with an axial bore 360 extending deep into the rod from the left end. The bore 360 is provided with internal threads 362 which receive the threaded shaft 364 of bolt 366 having a hex head. The bolt 366 has an axial hole 368 extending through it in which wire rope 196 slides loosely. The end of cable or wire rope 196 which projects out of bolt 366 has a ball 370 swaged on it. The ball 370 fits loosely in bore 360. The ball 368 is displaceable from the bolt shaft 364 end to the bottom or inner end of the bore 360. This distance is enough to fully compress spring 190 so as to release the parking brake.

The parking brake is applied by turning handwheel 260 clockwise until spring 190 fully expands. When the handbrake is in this position the handbrake does not interfere with operation of the brake cylinder by service brake air and parking brake air. However, when the handbrake has the spring brake in release position as shown in FIG. 15, the spring brake cannot apply emergency braking or parking braking if the truck on which it is mounted is in a train consist. If this develops because of a brakeman's failure, no significant harm will be possible because it will involve only one truck of many in the train.

The foregoing detailed description has been given for clearness of understanding only, and no unnecessary limitations should be understood therefrom, as modifications will be obvious to those skilled in the art.

What is claimed is:

1. A railroad truck having at least four wheels comprising:
   brake means for braking each wheel;
   a single enclosed air cylinder mounted on the truck;
   the air cylinder having first and second chambers;
   means to supply service air pressure to the first chamber;
   the first chamber containing means pneumatically operated by service air pressure to apply controlled service braking pressure, emergency braking pressure and, when the truck is stopped, parking braking pressure, to the brake means;
   the second chamber containing spring means which applies automatic parking pressure to the brake means when the truck is stopped, and applies emergency fail-safe pressure to the brake means when there is a pneumatic system failure to supply air to the first chamber;
   means to supply pressurized air to the second chamber to keep the spring means from applying pressure to the brake means so long as adequate air pressure is maintained in the second chamber;
   a handbrake assembly mounted on the truck in a position readily accessible for manual operation when the railroad truck is joined to a vehicle or separated therefrom; and
   the handbrake assembly including longitudinally manually reciprocal means operative to compress the spring means so that the brake means can be fully released and maintained released for an indefinite time so long as pneumatic braking pressure is not applied to the first chamber and upon manual reverse movement of the said longitudinally reciprocal means compression of the spring means is released so that the spring means can apply pressure to the brake means unless pneumatic pressure supplied to the first and second chambers prevents application of braking pressure by the spring means.

2. A railroad truck having at least four wheels comprising:
   brake means for braking each wheel;
   a single enclosed air cylinder having opposing first and second ends mounted on the truck;
   the cylinder having a diametrically positioned stationary bulkhead;
   the cylinder having a first chamber having a first piston on a first side of the bulkhead;
   means to apply service braking, emergency braking and parking braking pneumatic pressure in the first chamber between the bulkhead and first piston to outwardly displace the first piston;

a first piston rod joined to the first piston and extending outwardly from the cylinder into engagement with means operably joined to brake shoes to apply braking pressure to the brake means with outward movement of the first piston;

the cylinder having a second chamber having a second piston on a second side of the bulkhead;

means to apply pneumatic parking braking release pressure in the second chamber between the bulkhead and second piston to displace the second piston away from the bulkhead;

spring means, between the second piston and the second cylinder end, forcing the second piston towards the bulkhead;

a second piston rod joined to the second piston and in independently operable communication with the first piston rod so that the spring means can apply a compressive force through the second piston rod to the first piston rod for parking braking and also emergency fail-safe braking upon loss of all pneumatic pressure;

a handbrake assembly mounted on the truck in a position readily accessible for manual operation when the truck is joined to a train vehicle or separated therefrom; and the handbrake assembly including means operatively connected to the second piston to manually displace it and compress the spring means until the brake means is fully released and maintain the brake means released for an indefinite time.

3. A railroad truck having at least four wheels comprising:

brake means for braking each wheel;

a single enclosed air cylinder mounted on the truck;

the air cylinder having first and second chambers;

means to supply service air pressure to the first chamber;

the first chamber containing means pneumatically operated by service air pressure to apply controlled service braking pressure, emergency braking pressure and, when the truck is topped, parking braking pressure, to the brake means;

the second chamber containing spring means which applies automatic parking pressure to the brake means when the truck is stopped, and applies emergency fail-safe pressure to the brake means when there is a pneumatic system failure to supply air to the first chamber;

means to supply pressurized air to the second chamber to keep the spring means from applying pressure to the brake means so long as adequate air pressure is maintained in the second chamber;

a handbrake assembly mounted on the truck in a position readily accessible for manual operation when the railroad truck is joined to a vehicle or separated therefrom;

the handbrake assembly including a body spaced from the cylinder and a flexible tubular member extending from the body to the cylinder;

the body including an axially stationary rotatable screw having means to rotate the screw in both directions;

a movable block drivably engaged by the screw for longitudinal displacement in both directions upon rotation of the screw;

longitudinally reciprocal means including a flexible cable slidably positioned in the tubular member;

the flexible cable having means operatively connecting a first end portion to the block;

the flexible cable having a second end portion operatively connected to the spring means to compress the spring means from the extended state it assumes when pneumatic pressure to the second chamber cylinder is released, to the substantially fully compressed state it assumes when pneumatic pressure is applied in the second chamber; and the longitudinally reciprocal means being operative to compress the spring means so that the brake means can be fully released and maintained released for an indefinite time so long as pneumatic braking pressure is not applied to the first chamber and upon reverse movement of the said longitudinally reciprocal means compression of the spring means is released so that the spring means can apply pressure to the brake means unless pneumatic pressure supplied to the first and second chambers prevents application of braking pressure by the spring means.

4. A railroad truck according to claim 3 in which:
the cable second end portion is operatively connected to the spring means by means which permits full independent compression of the spring means by pneumatic pressure in the second chamber while the cable is longitudinally stationary.

5. A railroad truck according to claim 3 in which:
the truck has a truck bolster mounted in opposing side frames which are supported by a pair of axles, each having two wheels; and
the handbrake assembly body is mounted on one of the side frames.

6. A railroad truck according to claim 5 in which the handbrake assembly body is mounted on the top end of one of the side frames.

7. A railroad truck according to claim 6 in which a handwheel is mounted on the screw for manual rotation of the screw.

8. A railroad truck according to claim 3 in which the body includes an indicator which signifies whether the truck brakes are released or applied and the indicator is operable by movement of the block.

9. A railroad truck according to claim 8 in which the indicator includes a finger which projects out of the body when the parking brakes are released and remains in the body when the parking brakes are on.

10. A railroad truck having at least four wheels comprising:

brake means for braking each wheel;;

a single enclosed air cylinder mounted on the truck;

the air cylinder having first and second chambers;

the first chamber having pneumatically operated means which applies controlled service braking pressure, emergency braking pressure and parking raking pressure to the brake means when the truck is stopped;

the second chamber containing spring means which applies automatic parking pressure to the brake means when the truck is stopped, and applies emergency fail-safe pressure to the brake means, when there is a pneumatic system failure to supply air to the first chamber;

a pneumatic conduit to the second chamber to supply pressurized air to the second chamber to keep the spring means from applying pressure to the brake means so long as adequate air pressure is maintained in the second chamber;

a handbrake assembly mounted on the truck in a position readily accessible for manual operation when the truck is joined to a train vehicle or separated therefrom; and the handbrake assembly including manually reversible means operatively connected to the spring means to compress the spring means until the brake means is fully released and maintained released for an indefinite time and manual upon reverse operation of the said reversible means the spring means expands and applies pressure to the brake means.

* * * * *

UNITED STATES PATENT AND TRADEMARK OFFICE
CERTIFICATE OF CORRECTION

PATENT NO. : 4,793,449

DATED : December 27, 1988

INVENTOR(S) : SAM D. SMITH

It is certified that error appears in the above-identified patent and that said Letters Patent is hereby corrected as shown below:

In the title, change "RAILRAOD" to -- RAILROAD --; column 1, line 41, change "in accessible" to -- inaccessible --; column 4, line 5, change "o" to -- on --; column 5, line 41, change "tee" to -- the --; column 8, line 9, change "en" to -- end --, line 29, change "tee" to -- the --, line 58, change "hole, 346" to -- hole 346 --, line 65, change "fit" to -- fits --, line 68, change "of which" to -- to which --; column 9, line 18, change "190 With" to -- 190. With --; column 11, line 44, change "topped" to -- stopped --; column 12, line 58, change "raking" to -- braking --.

Signed and Sealed this

Sixteenth Day of May, 1989

Attest:

DONALD J. QUIGG

Attesting Officer

Commissioner of Patents and Trademarks